June 14, 1955  O. NORGORDEN ET AL  2,710,960
RADIO DIRECTION FINDER
Filed Oct. 26, 1945  3 Sheets-Sheet 3
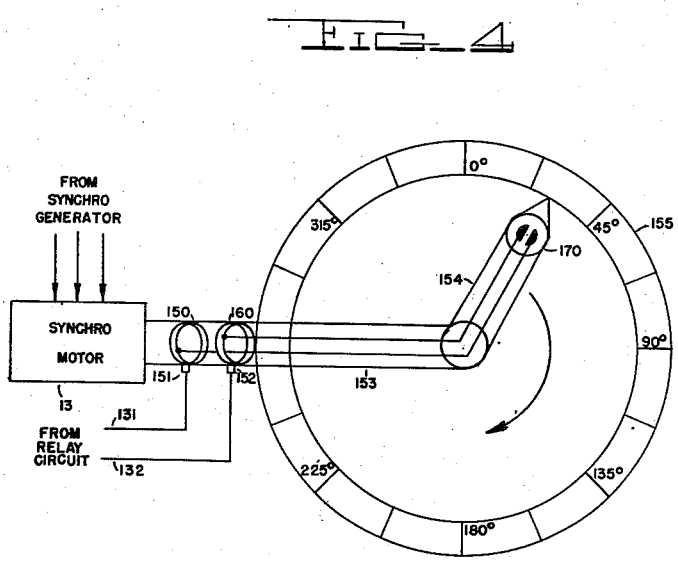
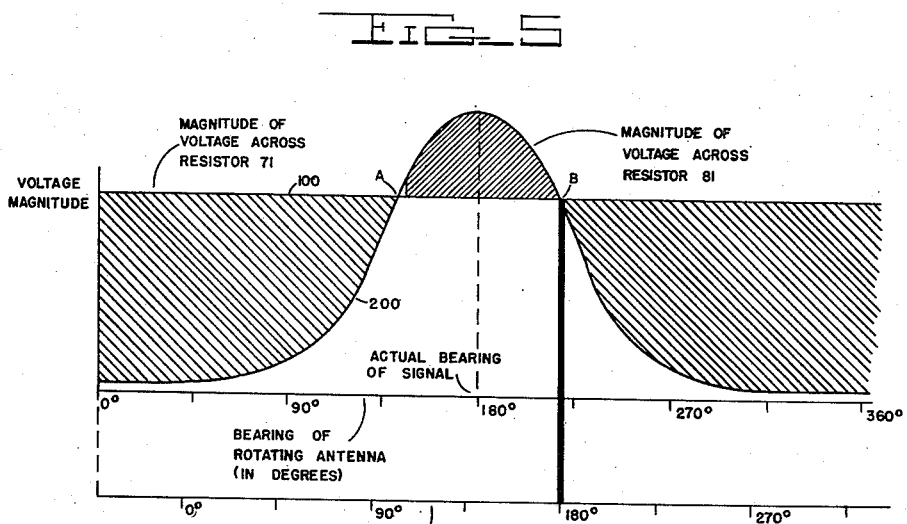
OSCAR NORGORDEN
RAYMOND W. HAYWARD, JR.
WILLIAM A. WHITE

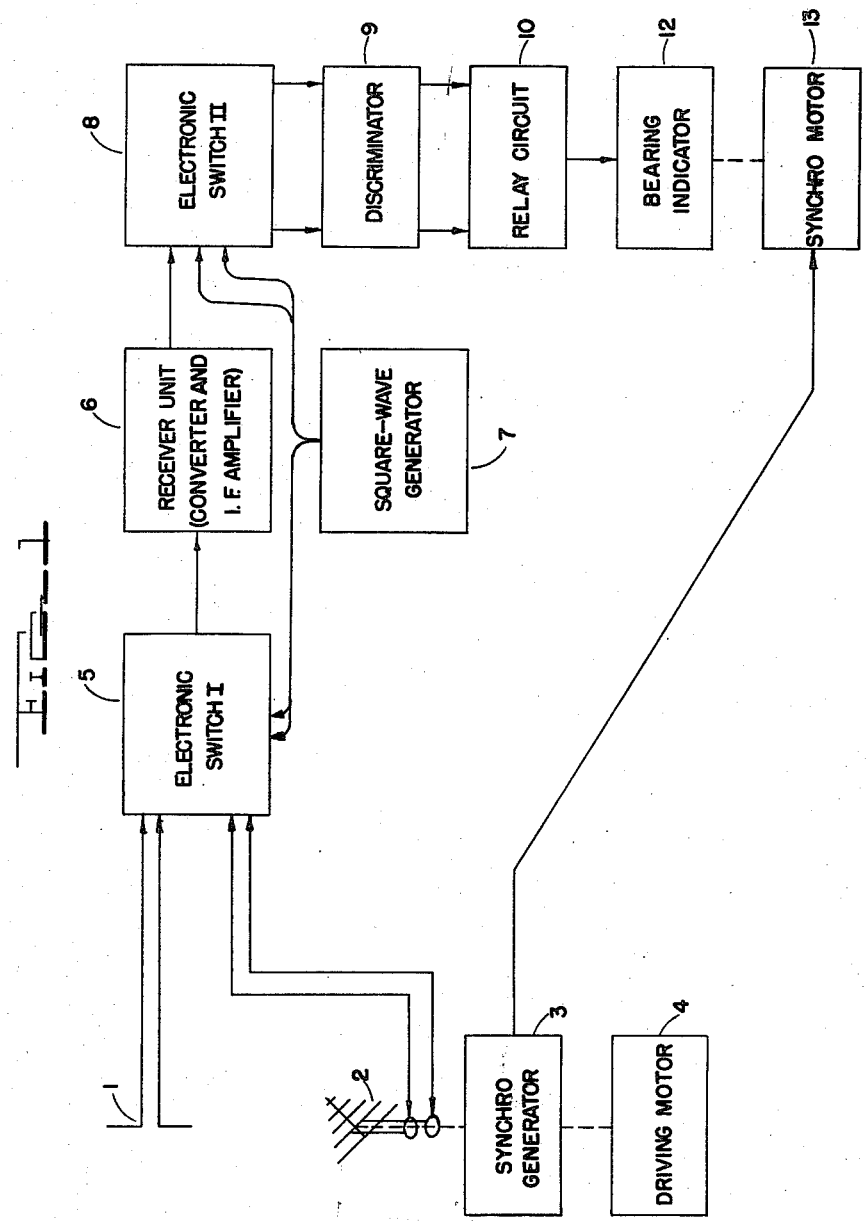

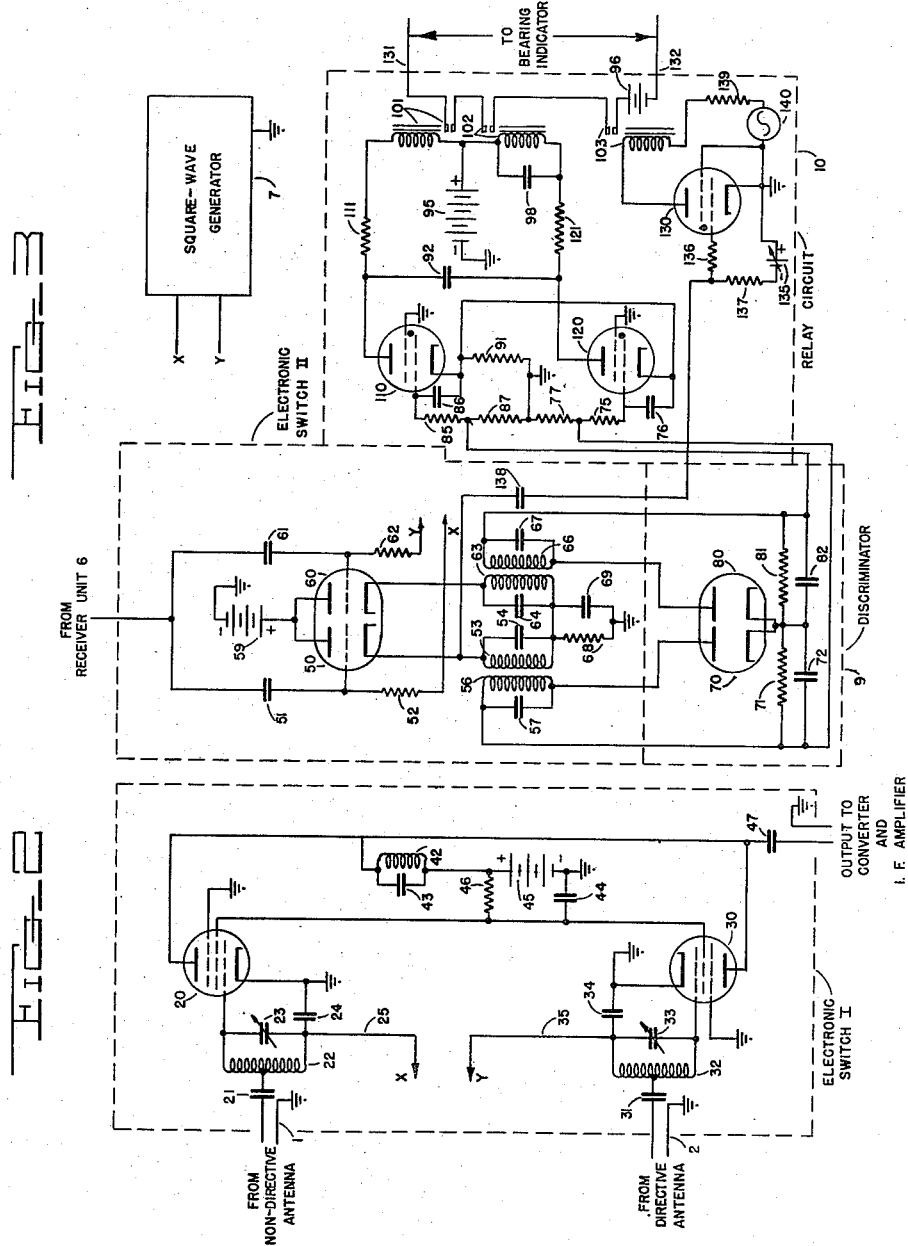

United States Patent Office 2,710,960
Patented June 14, 1955

2,710,960

RADIO DIRECTION FINDER

Oscar Norgorden and William A. White, Washington, D. C., and Raymond W. Hayward, United States Navy Application October 26, 1945, Serial No. 624,920

9 Claims. (Cl. 343—118)

(Granted under Title 35, U. S. Code (1952), sec. 266)

This invention relates to radio direction finders; in particular it relates to a direction finding apparatus adapted for employment with very high frequency signals.

The direction finding apparatus embraced in this invention employs a non-directional antenna in combination with a rotatable directional antenna having a single major lobe; that is, a rotatable antenna substantially responsive only to signals within a single span of azimuth. Signals received on the two antennas are compared electrically; accurate measurement of the bearing of a received signal is accomplished by determining the position of the rotating antenna whereat it delivers a signal having a predetermined amplitude relative to that delivered by the non-directional antenna.

An object of this invention is to provide a radio direction-finding apparatus which will accurately determine the bearing of very high frequency signals.

Another object of this invention is to provide a radio direction finding apparatus for high frequency signals which will continuously search for signals over 360° of azimuth and indicate automatically the bearing of a received signal.

The principles and operation of the invention may be best described with reference to the appended drawings, of which:

Figure 1 is a drawing in block and schematic form showing an illustrative embodiment of the invention;

Figure 2 is a schematic diagram showing the detailed circuit of one block component of the embodiment illustrated in Figure 1;

Figure 3 is a schematic diagram showing the circuits of three other block components of the embodiment illustrated in Figure 1;

Figure 4 is a diagrammatic showing in block and schematic form of a bearing indicator which might be employed as one of the components in the embodiment shown in Figure 1; and Figure 5 is a graph in Cartesian coordinates designed to illustrate the mode of operation of the invention.

Referring to Figure 1, the fundamental components of the invention are a fixed, non-directive antenna 1 and a rotatable directive antenna 2. Non-directive antenna 1 may take any form so long as its response is independent of the direction from which the signal is received; in simplest form it might be a single vertical dipole as shown. Directive antenna 2 may take any form effective to produce a directional characteristic having a single major lobe with a beam width substantially less than 180°; an elaborate antenna structure is not required because it is a property of the invention that the accuracy of its bearing determination is not appreciably affected by the beam width of the directional antenna component. In Figure 1, antenna 2 is illustrated schematically as a simple array of the Yagi type. Antenna 2 is mounted rotatably; mechanically coupled to it are synchro generator 3 and driving motor 4. The speed of rotation may vary according to the application; in one actual construction a rotating speed of 60 R. P. M. was employed.

The signals induced in antennas 1 and 2 are fed to the respective inputs of a first electronic switch, designated 5 in the drawings. The output of electronic switch 5 is connected to the input of a receiver unit comprising a converter and I. F. amplifier. Electronic switch 5 operates responsively to a square voltage wave from a square wave generator 7; it switches the receiver unit between the two antennas at a very rapid rate, which may be of the order of one thousand switching cycles per second.

The signals fed into receiver unit 6 are therein converted to an intermediate frequency and greatly amplified. The output of the intermediate frequency amplifier is applied to a second electronic switch, denoted 8 in the drawings, which functions responsively to voltage from square-wave generator 7, in synchronism with the first electronic switch 5. The two outputs of electronic switch 8 thus constitute respectively the signals as received on the non-directional antenna 1 and on the directional antenna 2, both sets of signals being, of course, greatly amplified. The two sets of signals are fed to a discriminator circuit 9 which rectifies both signals and produces direct voltages of magnitudes proportional to the amplitudes of the signals delivered by the respective antennas. Discriminator 9 is connected to a relay circuit 10; the discriminator compares the magnitudes of the two voltages, and at the point in each revolution of the directive antenna whereat the rectified voltage from it drops in amplitude below the signal from the non-directive antenna, the discriminator causes relay circuit 10 to produce a short, rectangular voltage pulse. This pulse is applied to bearing indicator 12 and may be therein employed to show the correct bearing of the signal being received. The indicator 12 may, as indicated in the drawing, have a rotary member driven in synchronism with antenna 2. In the embodiment of Figure 1, synchro motor 13, actuated by synchro generator 3, is coupled mechanically to the rotary component of the indicator to provide synchronized rotation.

The bearing information obtainable by this invention is much more accurate than could be had merely by turning the directional antenna for maximum response, because the rate of change of amplitude with antenna position is very rapid at the point where the response from the directional antenna equals that from the non-directive antenna; hence the point of equality is critical and sharply defined. The invention, properly adjusted and calibrated, will give bearing data accurate within one degree or less.

The synchro circuits, the square wave generator, and the receiver unit comprising the converter and I. F. amplifier may be conventional in design; hence no detailed description of their circuits will be given herein. The other components shown as blocks in Figure 1 are, however, more fully illustrated in Figures 2, 3, and 4. Figure 2 is a schematic diagram showing a typical circuit for electronic switch 5. Figure 3 shows illustrative circuits which may be employed in the electronic switch 8, the discriminator 9, and relay circuit 10. Figure 4 shows diagrammatically a possible design for the bearing indicator 12. Referring to Figure 2, tubes 20 and 30 are pentode tubes connected to separate control grid circuits but having a common plate load circuit. A tank circuit comprising coil 22 and condenser 23 in parallel is used to tune the grid circuit of tube 20; one side of coil 22 is connected to the control grid of tube 20 and the other side of coil 22 is connected to the cathode of tube 20 through by-pass condenser 24. A similar tank circuit comprising coil 32 and condenser 33 tunes the grid circuit of tube 30; one side of coil 32 is connected to the control grid of tube 30 and the other side of coil 32 is returned to the cathode of tube 30 through by-pass condenser 34. The cathodes and suppressor grids of tubes 20 and 30 are grounded. The screen grids of tubes 20 and 30 are connected together, by-passed to ground by condenser 44, and are connected to the positive side of D.-C. source 45 through dropping resistor 46. The plates of tubes 20 and 30 are connected together and are connected to the positive side of source 45 through a common plate load circuit comprising coil 42 and condenser 43 in parallel. The negative side of D.-C. source 45 is grounded. Grid bias lead 25 is connected between the undergrounded side of condenser 24 and the output terminal "X" of square wave generator 7. Grid bias lead 35 runs from the ungrounded side of condenser 34 to square wave generator terminal "Y."

The notations "X" and "Y" for terminals of square wave generator 7 are employed for the purpose of showing clearly the connections required to give proper phasing between electronic switch 5 and electronic switch 8, to be described in detail hereinafter. The output voltages at the terminals of square wave generator 7 are similar but opposite in phase; that is, during one half of the cycle terminal X is at ground potential and terminal Y is substantially negative; during the other half cycle terminal Y is at ground potential and terminal X is substantially negative. In consequence, when tube 20 is operative, tube 30 is cut off; and, conversely, when tube 20 is cut off, tube 30 is operative.

Signals from the non-directive antenna 1 are fed to coil 22 through blocking condenser 21; signals from the directional antenna 2 are applied to coil 32 through blocking condenser 31. The output is taken between the tube plates and ground, condenser 47 being employed to block high D.-C. plate potentials from the output circuit. Since tubes 20 and 30 operate alternately rather than simultaneously, the output signal fed by electronic switch 5 to the receiver unit 6 is proportional alternately to the signal received by one antenna, and that intercepted by the other.

Referring now to Figure 3, the signal output from the I. F. amplifier component of receiver unit 6 is fed to a second electronic switch 8 which performs the function of re-separating the signals from the respective antennas 1 and 2. In the embodiment illustrated, electronic switch 8 comprises two triode tubes 50 and 60; these tubes may be combined in a single envelope as shown in the drawing. The signal from receiver unit 6 is applied to the grid of tube 50 through coupling condenser 51 and to the grid of tube 60 through coupling condenser 61. The grid of tube 50 is connected through resistor 52 to terminal X of square wave generator 7; the grid of tube 60 is connected through resistor 62 to terminal Y of square wave generator 7. The plates of tubes 50 and 60 are connected together and connected to the positive side of D.-C. source 59. The negative side of D.-C. source 59 is grounded. The cathode of tube 50 is connected to one side of the I.-F. resonant tank circuit comprising coil 53 and condenser 54 in parallel. The other side of tank circuit 53, 54 is connected to one side of biasing resistor 68, the other side of resistor 68 being grounded. Condenser 69 is connected in shunt with resistor 68. The cathode of tube 60 is connected to one side of a tank circuit comprising coil 63 and condenser 64, in parallel. The other side of tank circuit 63, 64 is connected to the ungrounded side of resistor 68.

Discriminator component 9 incorporates diode tubes 70 and 80 which may be in a single envelope as shown. Coil 56 is inductively coupled to coil 53 and is shunted by condenser 57 to form an I. F. resonant tank circuit. One side of coil 56 is connected to the plate of diode 70; the other side of coil 56 is returned to the cathode of diode 70 through a load circuit consisting of resistor 71 and condenser 72 in parallel. Coil 66 is inductively coupled to coil 63 and is shunted by condenser 67 to form another I. F. resonant tank circuit. One side of coil 66 is connected to the plate of diode 80; the other side of coil 66 is returned to the cathode of diode 80 through a load circuit consisting of resistor 81 and condenser 82 in parallel. The cathodes of diodes 70 and 80 are connected together.

I. F. transformers 53, 56 and 63, 66 are identical and the degrees of coupling between the respective primary and secondary coils are equal. Likewise diode tubes 70 and 80 have similar characteristics and the two diode load circuits 71, 72 and 81, 82 are identical. The result is a symmetrical arrangement yielding a pair of D.-C. output voltages in series opposing. The voltage across load resistor 71 at any instant is proportional to the amplitude of the signal being received on the non-directional antenna 1. The voltage across load resistor 81 at any instant is proportional to the amplitude of the signal being received on rotary directional antenna 2. Since these two voltages are in series opposing, the magnitude of the net voltage across the series combination of resistors 71 and 81 equals the difference of the magnitudes of the individual voltages, and the polarity of the net voltage is that of the larger individual voltage.

The relay circuit 10 employs three thyratron gas tubes of similar type; in the drawing these tubes, denoted 110, 120, and 130 respectively, are shown as being of the screen grid type. The cathodes of tubes 110 and 120 are connected together and returned to ground through small biasing resistor 91. The screen grids of tubes 110 and 120 are grounded. A resistor network comprising resistors 85, 87, 77, and 75, in series in the order named, is connected between the control grid of tube 110 and the control grid of tube 120. Resistors 75 and 85 are identical; resistors 77 and 87 are identical. The junction of coil 66 and resistor 81 is connected to the junction of resistors 85 and 87; the junction of coil 56 and resistor 71 is connected to the junction of resistors 75 and 77. A small condenser 86 is connected between the control grid and cathode of tube 110; a similar small condenser 76 is connected between the control grid and cathode of tube 120. The junction of resistors 87 and 77 is grounded.

Condenser 92 is connected between the plate of tube 110 and the plate of tube 120. Resistor 111 and the coil of normally-open relay 101 are connected in series between the plate of tube 110 and the positive side of D. C. source 95. Resistor 121 and the coil of normally open relay 102 are connected in series between the plate of tube 120 and the positive side of D. C. source 95. Condenser 98 is connected across the coil of relay 102. The negative side of source 95 is grounded.

The cathode and screen grid of thyratron gas tube 130 are grounded. Resistor 139 and the coil of normally-open relay 103 are connected in series between one side of A. C. voltage source 140 and the plate of tube 130. The other side of A. C. source 140 is grounded. The positive side of variable-voltage D. C. source 135 is grounded; resistors 136 and 137 are connected in series between the grid of tube 130 and the negative side of D. C. source 135, resistor 136 being adjacent the grid. Condenser 138 is connected between the cathode of tube 50 in electronic switch 8 and the junction of resistors 136 and 137.

D. C. source 96 is connected in series with the contacts of relays 101, 102, and 103, the ends of the series circuit being connected to output leads 131 and 132 running to the bearing indicator. Due to the series connection of the relays no voltage from source 96 can appear between leads 131 and 132 unless all three relays are closed.

Thyratron tube 130, relay 103, and the components associated with them function as a "squelch circuit" to insure that no false bearing data can be sent to the bearing indicator in the absence of a received signal. Variable D. C. source 135 should be so adjusted that tube 130 is biased to a non-conducting condition in the absence of signal voltage. When a signal appears at the cathode of tube 50, the R. F. voltage thereupon applied to the grid of gas tube 130 causes that tube to conduct during the positive portion of each cycle of voltage from A. C. source 140 and the resulting rectified plate current causes relay 103 to close and to remain closed so long as a signal is being received. When the signal ceases, tube 130 ceases to conduct, relay 103 opens, and no voltage from source 96 can appear at the output leads. Since relay 103 is closed at all times when a signal is being received, it will be assumed to be closed in the explanation of relay circuit operation which appears in a later paragraph hereof and no further specific reference to the squelch circuit will be made.

Figure 4 shows diagrammatically a device which might be employed as the bearing indicator component of the invention. A circular scale 155 is shown, with a pointer 154 mounted so as to be rotatable in the plane of the scale with axis of rotation located at the center of scale 155. A shaft 153 is affixed to the pointer at its axis of rotation; it extends from the pointer in a direction perpendicular to the plane of the scale so that rotation of shaft 153 will cause pointer 154 to move around the face of scale 155. Shaft 153 is mechanically coupled to synchro motor 13. Synchro motor 13 operates responsively to signals transmitted from synchro generator 3 (shown on Figure 1) so as to rotate shaft 153 and pointer 154 in synchronism with the rotation of directional antenna 2. A neon glow bulb 170 is mounted on pointer 154 near its outer end, and the electrodes of bulb 170 are connected respectively to slip rings 150 and 160 on shaft 153. Brushes 151 and 152 make continuous contact with slip rings 150 and 160 respectively. Lead 131 from the relay circuit is connected to brush 151, and lead 132 is connected to brush 152. When a voltage pulse is transmitted on leads 131 and 132 from the relay circuit, bulb 170 will flash. The scale 155 may be calibrated with respect to a signal of known bearing so that the designation on the scale indicated by the pointer when the bulb flashes conforms to the correct bearing of the signal. The remainder of the scale can be calibrated symmetrically with respect to the known point. In the drawing scale 155 is shown calibrated in degrees of azimuth.

The relay circuit operation may be better explained with reference to Figure 5. That figure shows a graph in Cartesian coordinates; the vertical axis represents voltage magnitude, while the upper horizontal scale represents the bearing of the directive antenna's maximum sensitivity as the antenna rotates through 360°. The curves are drawn to show the voltages across resistors 71 and 81, which are respectively proportional to the signals from antennas 1 and 2, for a signal coming from a point 180° from the reference direction. Curve 100 is proportional to the signal amplitude from antenna 1; it is of course constant for all positions of antenna 2, since antenna 1 is fixed and non-directional. Curve 200 is proportional to the signal amplitude from antenna 2; for most positions of the antenna it is of course below curve 100 but at the point "A," as the antenna bearing nears that of the signal, the curve 200 rises and crosses curve 100, indicating that the magnitude of voltage across resistor 81 is greater than that across resistor 71. Curve 200 reaches a maximum at 180°, where the antenna 2 bears directly on the signal source, and drops off as the antenna turns further until at point "B" it crosses curve 100 in the downward direction, indicating the position at which the magnitude of voltage across resistor 81 has dropped off to equality with that across resistor 71. The point "B" is the point in the antenna's rotation whereat the bearing-data pulse is transmitted to the indicator. The relay circuit operates to accomplish this result in this way: During the greater part of the rotation cycle, the D. C. voltage across resistor 71 is greater than across resistor 81 and the voltage on the grid of gas tube 110 is positive relative to ground while that on gas tube 120 is negative. In consequence gas tube 110 conducts, gas tube 120 is non-conducting, and relay 101 is closed while relay 102 is open. This state of affairs is indicated on Figure 5 by shading sloping downward to the right. At point "A" the magnitude of voltage across resistor 81 becomes greater than that across resistor 71, the voltage on the gas tube grids reverses polarity, and gas tube 120 fires. Its plate voltage at once drops to a low value and the plate voltage of tube 110 is temporarily carried to a negative value by the charge on condenser 92, so tube 110 ceases conducting. This reversal of roles by the gas tubes results in relay 101 at once opening. Relay 102 does not close instantly, however, since the condenser 98 must charge before current will flow in the relay coil. Hence both relays are open for a brief interval; then relay 102 closes, and during the remainder of the rotation from "A" to "B," relay 101 is open and 102 is closed. This is indicated on Fig. 5 by shading sloping downward to the left.

When point "B" is reached by antenna 2, the polarity of the voltage at the gas tube grids returns to its original status, gas tube 110 fires, and tube 120 is extinguished. Relay 101 at once closes. Relay 102 does not instantly open, however, since the stored charge on condenser 98 maintains a flow of current in the coil of relay 102 for a brief interval after tube 120 is extinguished. Therefore, for a small part of the rotation cycle following point "B"—perhaps one degree—both relays 101 and 102 are closed. (Relay 103 is closed during the whole operation, as was pointed out in an earlier paragraph.) The simultaneous closure of all three relays results in production of a rectangular voltage pulse between output leads 131 and 132 which causes bulb 170 on the indicator to glow, giving the bearing information desired.

The lower horizontal scale of Figure 5 is a scale showing the bearing indicator readings for various positions of the rotating antenna. Since a signal bearing 180° causes the bulb to flash at point "B," the indicator is of course calibrated to read 180° when the antenna is at point "B," and so on.

It will be understood that the embodiment of the invention herein shown and described is exemplary only, and that the scope of the invention is to be determined by reference to the appended claims.

The invention described herein may be manufactured and used by or for the Government of the United States of America for governmental purposes without the payment of any royalties thereon or therefor.

What is claimed is:

1. A radio signal direction finder comprising a non-directional antenna, a unidirectional antenna having a single major response lobe with a beam width substantially less than 180°, means for varying the position of the unidirectional antenna, and means for comparing the amplitudes of the signal received by the respective antennae.

2. A radio signal direction finder comprising a non-directional antenna, a unidirectional antenna having a single major response lobe with a beam width substantially less than 180°, means for varying the position of the unidirectional antenna, and means for indicating the position of the unidirectional antenna whereat signal from a remote source is intercepted by the respective antennae with a predetermined strength ratio.

3. A radio signal direction finder comprising a non-directional antenna, a unidirectional antenna having a single major response lobe with a beam width substantially less than 180°, means for varying the position of the unidirectional antenna, and means for indicating the position of the unidirectional antenna whereat the ratio of the strength of a signal from a remote source as intercepted by the unidirectional antenna to the strength of the same signal as intercepted by the non-directional antenna drops below a predetermined value.

4. A radio signal direction finder comprising a non-directional antenna, a unidirectional antenna having a single major response lobe with a beam width substantially less than 180°, means for varying the position of the unidirectional antenna, bearing indicator means, and means connected between the antennae and said bearing indicator means for activating the bearing indicator means when the ratio of strength of a signal from a remote source as intercepted on the unidirectional antenna to the strength of the same signal as intercepted by the non-directional antenna drops below a predetermined value.

5. A radio signal direction finder comprising a non-directional antenna, a unidirectional antenna having a single major response lobe with a beam width substantially less than 180°, means for rotating the unidirectional antennae, receiver means coupled to the antennae operative to compare the amplitudes of the signal intercepted by the respective antennae, and bearing indicator means operative responsively to the receiver means to indicate the bearing of a received signal when the ratio of the amplitude of the signal from the remote source received on the unidirectional antenna to the amplitude of the same signal received on the non-directional antenna drops below a predetermined value.

6. A radio signal direction finder comprising a non-directional antenna, a unidirectional antenna having a single major response lobe with a beam width substantially less than 180°, means for rotating the unidirectional antenna, receiver means coupled to the antennae operative to produce a first D.-C. voltage proportional to the strength of a signal as received on the non-directional antenna and a second D.-C. voltage proportional to the strength of the same signal as received on the unidirectional antenna, relay means operative responsively to the D.-C. voltages to produce a voltage pulse when the second D.-C. voltage becomes smaller in magnitude than the first D.-C. voltage, and bearing indicator means activated by the voltage pulse from the relay means.

7. A radio direction finder comprising a non-directional antenna, a unidirectional antenna having a single major response lobe with a beam width substantially less than 180°, the gain characteristics of said unidirectional antenna being greater than the gain characteristics of said non-directional antenna, means for varying the position of the unidirectional antenna, and means for indicating the position of the unidirectional antenna whereat the strength of a signal from a remote source as intercepted by the unidirectional antenna is equal to the strength of the signal as intercepted by the non-directional antenna.

8. A radio direction finder comprising a non-directional antenna, a unidirectional antenna having a single major response lobe with a beam width substantially less than 180°, the gain characteristics of said unidirectional antenna being greater than the gain characteristics of said non-directional antenna, means for varying the position of the unidirectional antenna, and means for indicating the position of the unidirectional antenna whereat the ratio of the strength of a signal from a remote source as intercepted by the unidirectional antenna to the strength of the same signal as intercepted by the non-directional antenna drops below a predetermined value.

9. A radio direction finder comprising a non-directional antenna, a unidirectional antenna having a single major response lobe with a beam width substantially less than 180°, the gain characteristics of said unidirectional antenna being greater than the gain characteristics of said non-directional antenna, means for varying the position of the unidirectional antenna, bearing indicator means, and means connected between the antenna and said bearing indicator means for activating the bearing indicator means when the ratio of strength of a signal from a remote source as intercepted by the uni-directional antenna to the strength of the same signal as intercepted by the non-directional antenna drops below a predetermined value.

References Cited in the file of this patent

UNITED STATES PATENTS

| Number | Name | Date |
| --- | --- | --- |
| 2,183,746 | Hyland | Dec. 19, 1939 |
| 2,204,438 | Neufeld | June 11, 1940 |
| 2,243,523 | Davis | May 27, 1941 |
| 2,318,338 | Simon | May 4, 1943 |
| 2,329,199 | Hefele | Sept. 14, 1943 |
| 2,361,436 | Taylor | Oct. 31, 1944 |

FOREIGN PATENTS

| | | |
| --- | --- | --- |
| 436,186 | Great Britain | Oct. 7, 1935 |